HIGH-SPEED FACSIMILE SYNCHRONIZING SYSTEM

Filed Sept. 28, 1945

INVENTOR.
WILLIAM G.H. FINCH
BY
Ostrolenk and Faber
ATTORNEYS

Patented May 2, 1950 2,506,268

UNITED STATES PATENT OFFICE 2,506,268

HIGH-SPEED FACSIMILE SYNCHRONIZING SYSTEM

William G. H. Finch, Newtown, Conn.

Application September 28, 1945, Serial No. 619,168

5 Claims. (Cl. 178—69.5)

Figure 1:
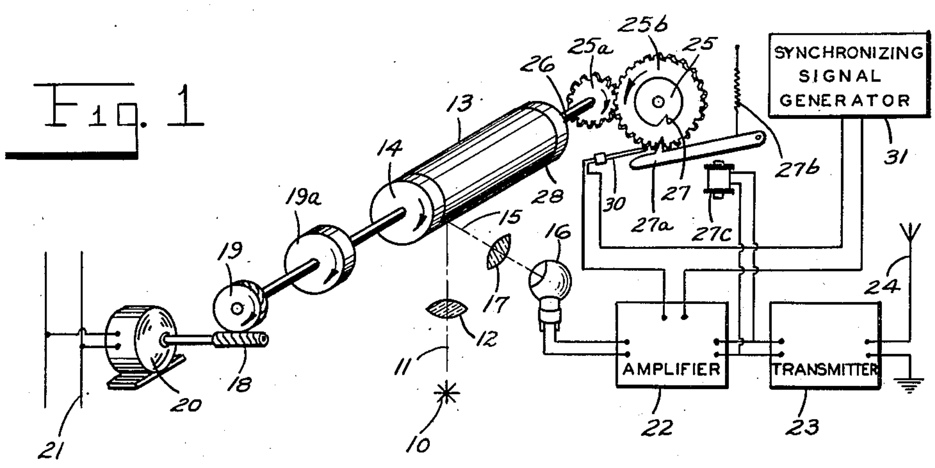

My present invention relates to the transmission and reception of facsimile by wire or radio, and more particularly to novel synchronizing mechanism which will operate efficiently at high speed picture transmission.

Heretofore, in the transmission and reception of facsimiles, it has been necessary, where absolute synchronism was desired between the transmitting and receiving apparatus, to transmit the facsimiles at a relatively slow speed. This relatively slow speed of about one hundred lines per minute has nevertheless been regarded as a rather high speed. For instance, where a drum was ten inches wide and one hundred lines per inch was transmitted, then at this speed a picture ten inches long and having a width only slightly less than the circumference of the drum, was transmitted in ten minutes or less. Modern developments have made it possible, however, to transmit facsimiles by photo-recording or chemical recording processes at a much higher speed. Thus, for instance, it has been found that without any attempt to maintain synchronism, speeds as high as four hundred lines per minute became feasible, and thus the ten-inch picture above described could be transmitted in two and one-half minutes.

Heretofore, synchronizing systems have consisted essentially of stop-start mechanisms of the type specifically described in my Patent No. 2,108,983. The receiving drum was rotated at a slightly greater speed that the transmitter, say, in a ratio of 101:100, so that the receiving drum would reach the synchronizing area first. The receiving drum was then brought to a stop or its rate of speed adjusted practically to zero for an extremely short interval pending the receipt of a synchronizing signal which would permit the receiving drum to start once more. The arrangement of the mechanical elements as well as of the electrical elements used for synchronizing was such that at one hundred lines per minute, the receiving drum could readily be brought to a stop and started once more at a rate approaching twice per second.

Where higher speeds were attempted, the start-stop method could be adapted by various adjustments to work properly at a scanning rate of one hundred twenty lines per minute (exactly two stop-start operations in each second), and even slightly higher, but at speeds of four hundred lines per minute the stop-start mechanism created too much vibration, thus interfering with the quality of the image being recorded, and at times causing the synchronizing impulse to be skipped entirely, due to the vibration introduced.

My novel synchronizing system contemplates a means whereby stop-start methods of synchonizing may be used, but nevertheless high speeds of the order of four hundred scanning lines per minute and even higher may readily be used.

Essentially, my invention contemplates the operation of the mechanical elements of the synchronizing system from a speed-reducing mechanism which will cause the stop-start operation to occur once in two, three, four, five or six or more revolutions of each of the drums.

It has been found that in the transmission of facsimiles at one hundred lines per minute, a synchronizing impulse sent approximately twice per second was sufficient to maintain accurate synchronization. Accordingly, my novel synchronizing system contemplates the sending of a synchronizing impulse at a rate of not more than twice per second and possibly less, even though the speed of the drum is increased by as much as four or five times. Thus, at a scanning rate of four hundred lines per minute, resulting in the reception of a ten-inch picture in two and one-half minutes, the synchronizing impulses will nevertheless be sent and operated at a rate of slightly less than twice per second.

To accomplish this purpose, the synchronizing signal switch is not operated directly in synchronism with each revolution of the transmitting drum, but is operated from a gear train or other speed-reducing mechanism once in several revolutions of the transmitting drum. Similarly, the stop-start mechanism of the receiver is operated once in several revolutions of the drum, the same number of revolutions as the transmitting drum. By this means, although picture impulses are transmitted at high speed, the synchronizing impulses are transmitted at a slower speed at which they may be effective.

Accordingly, the primary object of my invention is the provision of a novel synchronizing system adapted for use in connection with high speed transmission of facsimile images, in which the synchronizing system may nevertheless maintain proper synchronism between the transmitter and receiver, despite the high speed operation.

Another object of my invention is the arrangement of the mechanical elements of my novel synchronizing system so that they are not necessarily operated at every revolution or scanning line of the transmitter and receiver, but so that successive operations are spaced over several scanning lines, thereby permitting the successive synchronizing impulses to be fully effective.

Figure 2:
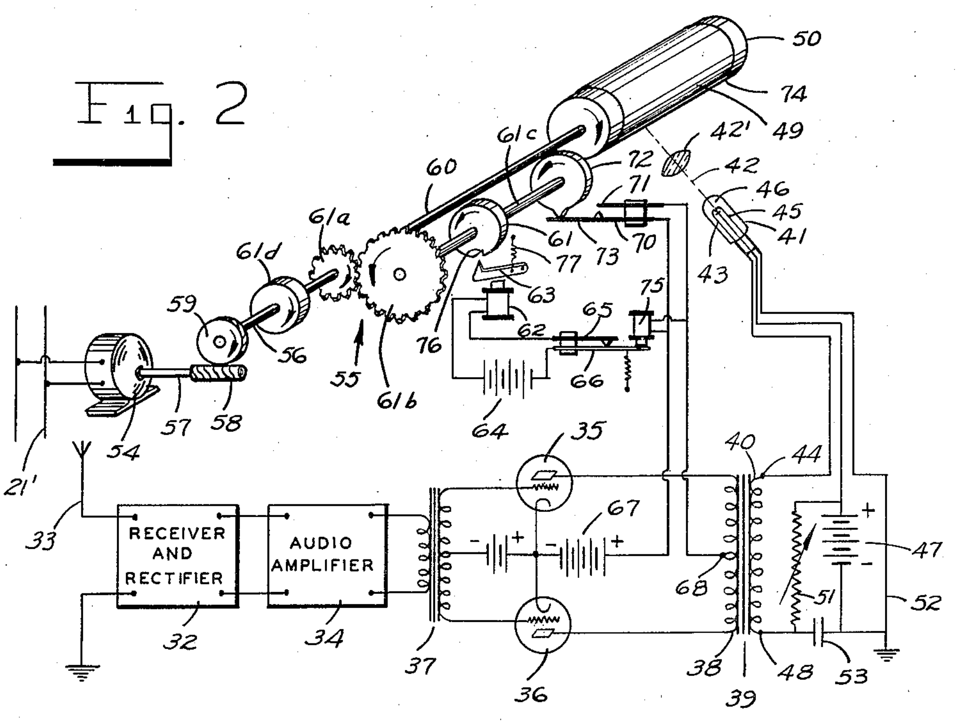

These and many other objects of my invention will become apparent in the following description and accompanying drawing, in which:

Figure 1 is a schematic view of a facsimile transmitter embodying my novel synchronizing apparatus; and Figure 2 is a schematic view of a facsimile receiver embodying my novel synchronizing apparatus.

Referring to Figure 1, a source of light 10 generates a beam 11 focused to a point by a lens system 12 upon the picture 13 to be transmitted, which is mounted on the cylindrical drum 14. If the picture is scanned one hundred lines per inch, the diameter of the light spot focused upon the picture 13 should be .01 inch. The refracted beam 15 from the picture is focused upon the photoelectric cell 16 by lens system 17. The intensity of the refracted beam 15 is proportional to the shading of the picture elements which are successively moved past the light beam 11.

The picture drum 14 is rotated by worm 18 and worm gear 19 which suitably reduce the speed of the motor 20. Clutch 19*a* or other phasing mechanism is connected between the worm gear 19 and the drum 14. The phasing mechanism itself may have the construction and operation shown in my prior Patent No. 2,108,983, or it may simply comprise an appropriate clutch with a fast pickup so that the motor 20 and the worm gear 19 may continue to operate should drum 14 be stopped in any way, and so that the drum 14 will immediately be permitted to rotate on release.

Motor 20 is preferably a synchronous motor connected to a commercial electrical supply line 21, for example a sixty-cycle, 110-volt system. The drum is driven at the high speeds hereinafter discussed.

The refracted picture light beam 15 impinging on photoelectric cell 16 produces corresponding electrical signals which are amplified by amplifier 22. A light "chopper" or an audio frequency carrier wave may be employed with the amplifier 22 to facilitate transmission of the varying unidirectional picture signals, as is well known in the art.

The telepicture signals may be directly transmitted to a remote station over wire lines or may be transmitted by radio transmission means. Figure 1 illustrates a transmitter 23 connected to the output of amplifier 22 for converting the audio frequency telepicture signals into corresponding radio fraquency signals which are radiated by antenna 24.

Synchronizing signals are cyclically transmitted for effecting syncronization of the transmitter scanning apparatus in a manner to be described in detail. The synchronizing signals have heretofore been transmitted once per scanning operation. The present synchronizing apparatus is arranged, however, as shown in Figure 1, so that the synchronizing signal will be transmitted at the end of each group of scanning lines. Depending entirely on the ratio between gears 25*a* and 25*b* hereinafter to be described, where the ratio is 1:4, a synchronizing signal will be transmitted at every fourth line; and where the ratio is 1:2, it will be transmitted at every second line. Essentially, the ratio between gears 25*a* and 25*b* is adjusted with respect to the predetermined high speed of rotation of drum 14 so that the synchronizing operation will occur no more frequently than twice per second, thereby giving ample spacing between synchronising signals.

When a drum is used as in the preferred embodiment, the "underlap" portion of the rotation cycle is employed to transmit the synchronizing signal. The underlap period corresponds to the portion of the picture drum where the opposite ends of the picture 13 are gripped or otherwise fastened into position on the drum.

Gear 25*a* is mounted on the end of shaft 26 of the telepicture drum 14. It meshes with gear 25*b*, which carries the cam plate 25. As above pointed out, gear 25*b* is larger in diameter than gear 25*a* by a ratio which can be expressed in whole numbers, thereby reducing the speed of gear 25*b* by a ratio which can also be expressed in whole numbers. It is necessary that the ratio be expressed in whole numbers so that the operator for the synchronizing signal will always correspond with the underlap section of the drum. The angular indentation 27 in the cam 25 is positioned so that it will correspond to the underlap portion 28 of the drum 14, i. e., whenever the recess 27 in cam 25 moves opposite the armature 27*a* of magnet 27*c* herein described, then at that instant the underlap portion 28 of drum 14 will move past the light beam 11. The edge 28 of the picture sheet 13 determines one side of the underlap zone and is gripped by clamping means internal to the drum 14 in a manner described in my prior Patent No. 2,051,511.

The synchronizing cam switch 30 is cyclically closed by cooperation of the armature 27*a* with the recess 27 at the appropriate angular position of the synchronizing apparatus, to impress suitable synchronizing impulses upon amplifier 22 from the synchronizing signal generator 31. Armature 27*a* is biased toward engagement with the surface of cam 25 by the spring 27*b*. When the recess 27 of cam 25 moves opposite the end of armature 27*a*, the armature is thus driven up into recess 27. This holds cam 25 and its associated gear 25*b*, thereby holding the gear 25*a*, the shaft 26 and the drum 14. The clutch 19*a*, as previously described, permits the motor 20, worm gear 18 and worm 19 to continue operation at this time. The transmitter drum is, however, brought to a stop. Simultaneously the armature 27*a* closes the synchronizing switch 30, as above described.

Synchronizing switch 30 is connected in series with the synchronizing signal generator 31 output to a suitable portion of the telepicture amplifier 22 schematically indicated in Figure 1. The synchronizing impulse effective during the underlap period is preferably of intensity somewhat greater than the maximum or "white" telepicture signal intensity, in order to readily distinguish the synchronizing signals from the telepicture signals at the receiver.

The synchronizing signal generator 31 may be a direct current source which produces a unidirectional impulse at each closure of cam switch 30, or may be an audio carrier frequency signal which is unmodulated during the synchronizing period and is suitably modulated by the picture signals during the remaining period of the cycle. A preferred embodiment of such a method for signal generation forms the basis of my prior Patent No. 2,069,061.

Simultaneously with the transmission of the synchronizing signal, magnet 27*c* is energized, attracting the armature 27*a* and pulling it out of its engagement with the recess 27 in cam 25, and thus permitting cam 25, gears 25*b* and 25*a*, and drum 14 to rotate once more. At the same time, as hereinafter described, the sending of the synchronizing signal by the transmitter 23 releases the receiving drum of Figure 2 for continued rotation.

In the ordinary case where synchronism has been desired, it has not heretofore been customary to stop the transmitting drum, but only to stop the receiver drum awaiting receipt of a signal from the transmitter. If the same type of operation is desired here, then cam 25 need merely have a projection instead of the recess 27 to operate the cam switch 30, and the armature 27a and its magnet 27c may be dispensed with. However, since two, three, four, five, six or more scanning lines may by my novel system be transmitted before a single synchronizing impulse, I have found it practical to stop the transmitter also at the time of the sending of the synchronizing impulse, in order to be absolutely certain that the transmitter and receiver will start together. Where the possible variations in speed between the transmitter and receiver are relatively minute for each revolution so that the cumulative variation in speeds between each adjacent pair of synchronizing signals is not observable, then the stopping mechanism may be dispensed with, and switch 30 may merely be operated by a projection from the cam 25. The essential element is that the receiver be stopped or slowed down to negligible speed pending the receipt of the synchronizing impulse, so that it may start at the same angular position as the transmitter.

Figure 2 is a schematic diagram of a telepicture receiver used in conjunction with the transmitter of Figure 1, and employing the synchronizing mechanism of my present invention. A radio receiver and rectifier 32 is connected to a receiving antenna 33 for receiving the radio transmitted signals from the radio transmitter 23. If a wire line is used, suitable amplfying and line equipment are used instead. The output of the receiver and rectifier 32 is connected to an audio amplifier 34. The output of audio amplifier 34 is coupled to a class B push-pull output stage 35—36 by an interstage coupling transformer 37. The output of the push-pull stage 35—36 is connected to the primary 38 of the output transformer 39. The output of the secondary 40 of transformer 39 is connected to a photolamp 41 containing a gas such as neon, for producing a light beam 42 output in accordance with the telepicture signals received. The light output 42 from lamp 41 is suitably focused upon the record sheet 49 on the receiving drum 50 by a lens system 42′.

I have here used a neon crater photo-lamp 41 having a control electrode 43 which is connected to one terminal 44 of the transformer secondary 40, and an auxiliary or striking electrode 45. The crater plate 46 of lamp 41 is connected to the positive terminal of a suitable direct current source 47, the negative terminal of which is connected to ground. The other terminal 48 of the transformer secondary 40 is connected to the crater plate 46 through a variable resistance 51. The auxiliary or striking electrode 45 is connected to ground by lead 52. As is well known in the art, the auxiliary electrode 45 maintains a striking or discharge condition at the photolamp crater plate 46, so that it will always be in readiness to respond to telepicture signals introduced between the plate 46 and the control grid 43. A by-pass condenser 53 is connected between the output terminal 48 and ground.

The receiver drum 50 is driven by a synchronous motor 54 connected to supply lines 21′. The lines 21′ are, when possible, from the same alternating current supply lines 21 as those of the transmitter, although such condition is not essential. The synchronous motor 54 drives drum 50 through the schematically indicated synchronizing phase adjusting mechanism 55.

The drum phasing mechanism 55 maintains a driving connection between the shaft 56 which is driven positively from the motor shaft 57 through worm 58 and worm gear 59, and the shaft 60 directly attached to the receiver drum 50.

The control plate 61 cooperating with the phasing mechanism 55 is actuated by the synchronizing magnet 62 through its armature 63. Drum 50 is preferably driven at a slightly faster speed than the corresponding transmitter drum 14, for example, in a ratio of 401:400.

The phasing mechanism 55 is under the control of the synchronizing magnet 62 to maintain the drum 50 in phase synchronism with the transmitter drum 14. A direct current potential source 64 supplies the synchronizing magnet 62 through its relay contacts 65—66.

The phasing apparatus here described may correspond generally to the phasing apparatus shown in connection with the receiver of my prior Patent No. 2,108,983. It comprises a clutch 61d between shaft 60 of drum 50 and motor 54, which clutch may be arranged and operated in the manner set forth in the above-mentioned patent, or it may comprise simply a pair of friction discs or any other clutch elements which will permit the drum 50 to be stopped or slowed down to negligible speed pending the receipt of a synchronizing impulse. Gear 61a is driven from shaft 60, and drum 50 drives the gear 61b on shaft 61c. The ratio between gears 61a and 61b should be exactly equal to the ratio between gears 25a and 25b. Gear 61b on shaft 61c drives the controlling plate 61 and the cam plate 72. Control plate 61 will effect a stopping or slowing down to negligible speed of the receiving drum 50 at an underlap portion 74 thereof, to await the receipt of a synchronizing signal. When the synchronizing signal is received, the energization of magnet 62 in the manner hereinafter described, pulls the armature 63 down and releases the drum 50 for operation.

The anode potential source 67 for the push-pull amplifier stage 35—36 is supplied to the center tap 68 of the primary 38 through the synchronizing cam switch 70—71. A cam 72 is connected to the shaft 60 adjacent the drum 50. The projection 73 of the cam 72 is in the same angular position on shaft 60 as the underlap or "dead" zone 74 of the drum 50. The cam switch 70—71 is normally maintained closed during the major portion of the rotation of cam 72, and the anode current from source 67 normally directly flows to the push-pull amplifier stage 35—36 during the reception of the telepicture signals.

The cam switch 70—71 is opened by the projection 73 of the cam 72 during the synchronizing period of the receiver at an underlap portion thereof. The anode current from source 67 is accordingly directed to the amplifier 35—36 through the synchronizing relay 75, which relay 75 is otherwise short-circuited by switch 70—71.

The synchronizing signal, as hereinabove described, occurs during an underlap period of the picture transmitter, and is preferably of greater magnitude than the telepicture signals. Synchronizing relay 75 is preferably a marginal relay responding only to the increased magnitude signals so as to avoid the possibility of interference of the synchronizing action by any of the telepicture signals. The push-pull amplifier 35—36 rectifies an alternating current synchronizing impulse in the anode lead if such is used, and the actuation of the relay 75 is by rectified or unidirectional current, as will be understood by those skilled in the art.

Although I prefer to use synchronizing signals of increased intensity, and a marginal synchronizing relay, I have also successfully employed synchronizing signals of intensity equal to the maximum intensity picture signals to operate an ordinary relay. It is also to be understood that the synchronizing magnet 62 may be directly energized by the synchronizing signals, displacing the relay 75.

The receiver drum 50 is prepared for the synchronizing signal during its underlap period by cam 72. The synchronizing signal will flow through to energize the synchronizing relay 75 which then closes the relay contacts 65—66, locally energizing the synchronizing magnet 62. The synchronizing magnet 62, when energized, will attract the armature 63 away from control plate 61 to permit the phasing mechanism 55 to continue to normally drive the receiver drum 50, i. e., if the drum 50 were in phase synchronism and in proper phase, the release of armature 63 away from the plate 61 would avoid phasing or angular correction by the mechanism 55.

The control plate 61 of the phase-correcting mechanism 55 has a notch 76 on its periphery; the angular position of notch 76 corresponds to the angular position of the underlap zone 74 of drum 50 and that of the projection 73 of cam 72. For this reason the ratio between gears 61*a* and 61*b* as well as the ratio between gears 25*a* and 25*b* should be expressed in whole numbers. The armature 63 is normally mechanically biased by spring 77 against the periphery of the control plate 61. Armature 63 accordingly engages the notch 76 of control plate 61 and holds it against rotation. By preventing the rotation of control plate 61, the angular or phase-correcting mechanism 55 is actuated to effect the phase synchronism of drum 50 with transmitter drum 14, in a manner to be described in detail hereinafter.

By rotating the drum 50 at a slightly faster rate than the transmitter drum 14, for example in the ratio of 401:400, the underlap period of the drum 50 will reach the predetermined position corresponding to the engagement of armature 63 of notch 76 slightly before the normal reception of the synchronizing signal from the transmitter. The cam 72 will accordingly open cam switch 70—71 by the projection 73 and permit the energization of synchronizing relay 75 by the synchronizing impulse as it is received. The energization of synchronizing relay 75 by the synchronizing impulse will close relay 65—66 to correspondingly energize the synchronizing magnet 62 to attract the armature 63 away from engagement with notch 76 of control plate 61. The drive connection between the motor 54 and the drum 50 is continuously maintained and the synchronizing signal in attracting the armature 63 away from the control plate 61 permits the drum 50 to continue rotating with the drive connection intact and in accurate phase synchronous relation with the transmitter drum.

In the foregoing I have described my invention solely in connection with a preferred embodiment thereof. The essential element is that irrespective of the high speed of rotation of the transmitter and receiver drums, the synchronizing impulses are sent at spaced intervals at the end of groups of scanning lines. Where, for instance, the synchronization cannot occur efficiently at a speed much higher than twice per second, while the drum rotates eight times per second, then the drive for the mechanical elements of the synchronizing signal is arranged in 4:1 ratio to operate the synchronizing signal at a rate of twice per second, and at the end of each group of four scanning lines.

While I have shown my novel synchronizing system as arranged for cooperation with drum types of transmitters and receivers, which scan a helical trace, it will be obvious that my invention may be used with continuous sheet-type scanning devices of the character shown, for instance, in my prior Patent No. 2,047,863, and with oscillating arm type scanners of the type shown in my Patent No. 2,032,558, and with lawn-mower or spiral-type scanners.

Since many variations and modifications of my invention will now be apparent to those skilled in the art, and since the foregoing is simply an illustrative embodiment of my novel synchronization principle, I prefer not to be bound by the specific disclosure herein contained, but only by the appended claims.

I claim:

1. In a high-speed facsimile system comprising a high-speed facsimile transmitter and a high-speed facsimile receiver; said transmitter and receiver each comprising cyclically moving members and means for operating the same; means at the transmitter for generating a synchronizing signal at a predetermined point in each cycle; means at the receiver responsive to the synchronizing signal for controlling the movement of the cyclically movable member; a speed reducing mechanism, a rotatable member driven by said cyclically moving member at said receiver through said speed reducing mechanism and having means thereon controlled by said synchronizing responsive means for controlling the synchronism of said cyclical member at said receiver.

2. In a high-speed facsimile system comprising a high-speed facsimile transmitter and a high-speed facsimile receiver; said transmitter and receiver each comprising cyclically moving members and means for operating the same; means at the transmitter for generating a synchronizing signal at a predetermined point in each cycle; means at the receiver for receiving said synchronizing signal and responsive thereto; said means being operable to hold said cyclically movable member periodically; and means connected to said cyclically movable member engageable by the means responsive to the synchronizing signal for cooperating with said responsive means to halt said cyclically movable member, said last-mentioned means being cyclically operated at a substantially slower rate than said cyclically movable member.

3. In a high-speed facsimile system comprising a high-speed facsimile transmitter and a high-speed facsimile receiver; said transmitter and receiver each comprising cyclically moving members and means for operating the same; means at the transmitter for generating a synchronizing signal at a predetermined point in each cycle; means at the receiver for receiving said synchronizing signal and responsive thereto; said means being operable to hold said cyclically movable member periodically; and means connected to said cyclically movable member engageable by the means responsive to the synchronizing signal for cooperating with said responsive means to halt said cyclically movable member, a gear reducing mechanism, said last-mentioned means being cyclically operated by said cyclically movable member through said gear reducing mechanism at a substantially slower rate than said cyclically movable member; the proportionate rates of speed of the cyclically movable member and said last-mentioned means being expressed in whole numbers.

4. In a high-speed facsimile system comprising a high-speed facsimile transmitter and a high-speed facsimile receiver; said transmitter and receiver each comprising cyclically moving members and means for operating the same; means at the transmitter for generating a synchronizing signal at a predetermined point in each cycle; means at the receiver for receiving said synchronizing signal and responsive thereto; said means being operable to hold said cyclically movable member periodically; and means connected to said cyclically movable member engageable by the means responsive to the synchronizing signal for cooperating with said responsive means to halt said cyclically movable member, said last-mentioned means being cyclically operated at a substantially slower rate than said cyclically movable member; the proportionate rates of speed of the cyclically movable member and said last-mentioned means being expressed in whole numbers; said last-mentioned means being engaged by said synchronizing signal responsive means only at a predetermined portion of the cycle of said cyclically movable member.

5. In a high-speed facsimile system comprising a high-speed facsimile transmitter and a high-speed facsimile receiver; said transmitter and receiver each comprising cyclically moving members and means for operating the same; means at the transmitter for generating a synchronizing signal at a predetermined point in each cycle; means at the receiver for receiving said synchronizing signal and responsive thereto; said means being operable to hold said cyclically movable member periodically; and means connected to said cyclically movable member engageable by the means responsive to the synchronizing signal for cooperating with said responsive means to halt said cyclically movable member, said last-mentioned means being cyclically operated at a substantially slower rate than said cyclically movable member; the proportionate rates of speed of the cyclically movable member and said last-mentioned means being expressed in whole numbers; said last-mentioned means being engaged by said synchronizing signal responsive means only at a predetermined portion of the cycle of said cyclically movable member; said cyclically movable member operating through a plurality of cycles between successive engagements of said last-mentioned means.

WILLIAM G. H. FINCH.

REFERENCES CITED

The following references are of record in the file of this patent:

UNITED STATES PATENTS

| Number | Name | Date |
|---|---|---|
| 2,108,983 | Finch | Feb. 22, 1938 |
| 2,150,239 | Nichols | Mar. 14, 1939 |
| 2,212,971 | Finch | Aug. 27, 1940 |
| 2,329,077 | Nichols | Sept. 7, 1943 |